United States Patent
Okazaki et al.

[11] Patent Number: 6,132,594
[45] Date of Patent: Oct. 17, 2000

[54] HYDROCRACKING CATALYST AND HYDROCRACKING METHOD FOR HYDROCARBON OILS

[75] Inventors: Hajime Okazaki; Hisao Sakoda; Michiaki Adachi; Shigeo Kure, all of Yokohama, Japan

[73] Assignee: Nippon Mitsubishi Oil Corp., Japan

[21] Appl. No.: 09/292,185

[22] Filed: Apr. 15, 1999

[30] Foreign Application Priority Data

Apr. 15, 1998 [JP] Japan ................... 10-105132

[51] Int. Cl.⁷ .................................... C10G 47/00
[52] U.S. Cl. ................... 208/111.01; 208/111.1; 208/111.2; 208/111.3; 208/111.35; 502/63; 502/64; 502/66; 502/73; 502/74; 502/79
[58] Field of Search ................ 208/111.01, 111.1, 208/111.2, 111.3, 111.35; 502/63, 64, 66, 73, 74, 79

[56] References Cited

U.S. PATENT DOCUMENTS

| | | | |
|---|---|---|---|
| 3,506,400 | 4/1970 | Eberly, Jr. et al. | 502/79 |
| 3,591,488 | 7/1971 | Eberly, Jr. et al. | 502/79 |
| 4,762,813 | 8/1988 | Ward . | |
| 4,767,734 | 8/1988 | Ward . | |
| 4,784,750 | 11/1988 | Dufresne et al. | 208/120 |
| 4,857,171 | 8/1989 | Hoek et al. . | |
| 4,925,820 | 5/1990 | Hoek et al. . | |
| 4,990,476 | 2/1991 | Ward . | |
| 5,288,396 | 2/1994 | Ward . | |
| 5,468,700 | 11/1995 | Ward . | |
| 5,954,946 | 9/1999 | Klazinga et al. . | |

FOREIGN PATENT DOCUMENTS

| | | |
|---|---|---|
| 0220616A2 | 5/1987 | European Pat. Off. . |
| 0247678A2 | 12/1987 | European Pat. Off. . |
| 0703003A1 | 3/1996 | European Pat. Off. . |
| 58-210846 | 12/1983 | Japan . |
| 58-210990 | 12/1983 | Japan . |
| 58-219290 | 12/1983 | Japan . |
| 2562322 | 9/1996 | Japan . |
| 2563910 | 9/1996 | Japan . |
| 2619700 | 3/1997 | Japan . |

*Primary Examiner*—Tom Dunn
*Attorney, Agent, or Firm*—Ostrolenk, Faber, Gerb & Soffen, LLP

[57] ABSTRACT

A hydrocracking catalyst for hydrocarbon oil, comprising a complex oxide with at least 2 different elements selected from Group 3b, Group 4a, Group 4b and Group 5b of the Periodic Table, zeolite having a solid Al-NMR spectrum wherein the ratio A/B of the peak area A in a chemical shift of −30 to 18 ppm to the peak area B in a chemical shift of 20–100 ppm is 0.01–0.39 and whose surface area of pores of diameter 10 angstrom or smaller constitutes 10–85% of the total surface area, and at least one metal selected from Group 6a and Group 8 of the Periodic Table. Also, a hydrocracking method characterized by hydrocracking of petroleum distillates with a boiling point of 250–600° C. using the hydrocracking catalyst in the presence of hydrogen, under conditions with a reaction temperature of 100–800° C., a reaction pressure of 3–30 MPa, an LHSV of 0.01–10 $h^{-1}$ and a hydrogen/oil ratio of 100–2500 $Nm^3/m^3$.

12 Claims, 1 Drawing Sheet

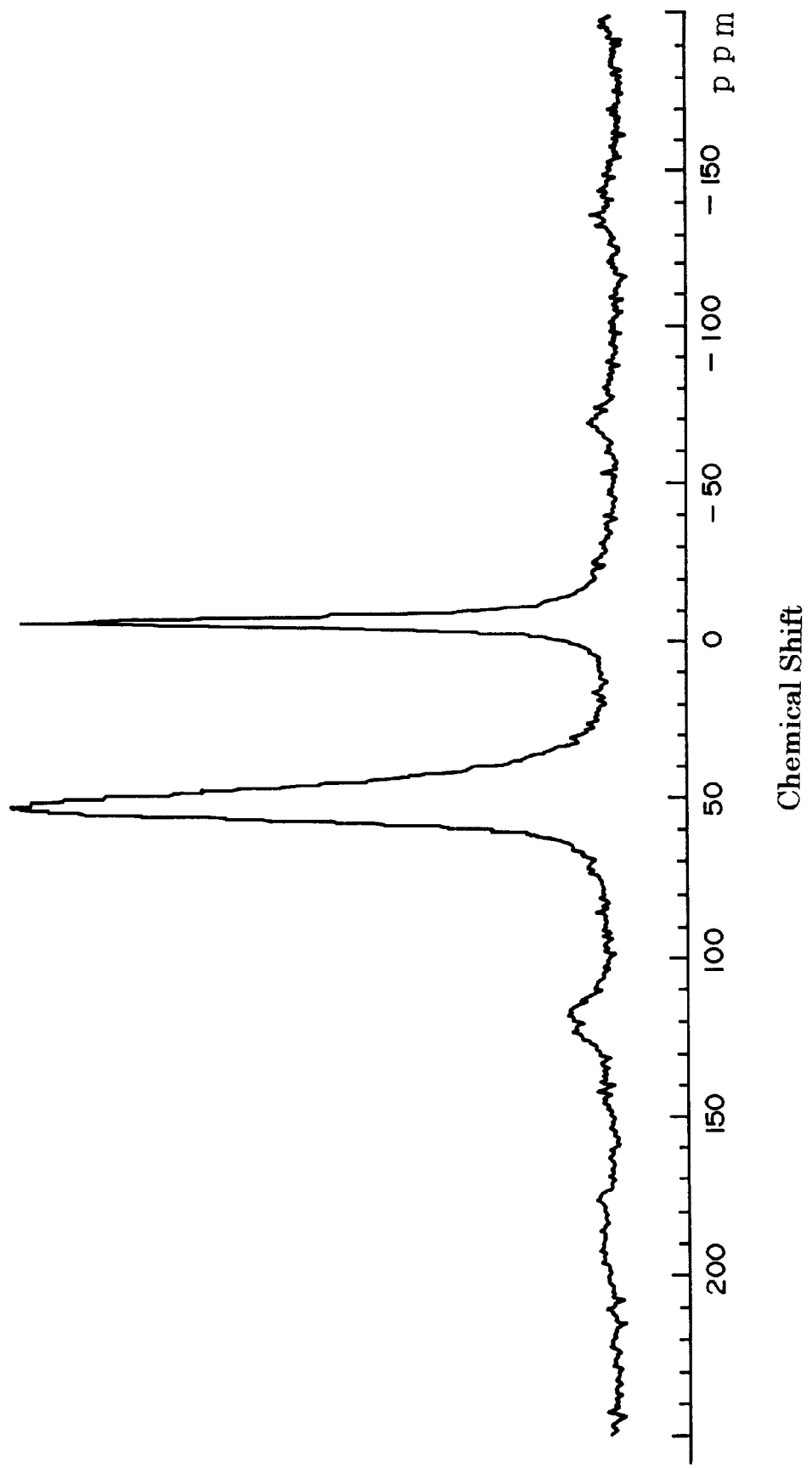

HYDROCRACKING CATALYST AND HYDROCRACKING METHOD FOR HYDROCARBON OILS

BACKGROUND OF THE INVENTION

1. Field of the Invention

The present invention relates to a hydrocracking catalyst and a hydrocracking method for hydrocarbon oils, and more specifically, it relates to a hydrocracking catalyst with excellent hydrocracking performance for heavy petroleum distillates such as vacuum gas oil, and to a hydrocracking method using the catalyst which gives middle distillates as the major products.

2. Background Art

Recent years have seen an increased demand for light petroleum products, while heavy types of crude oil have tended to become more available. This has further increased the important role of heavy oil cracking apparatuses.

Various different hydrocracking catalyst compositions and preparation processes for heavy oils have been proposed. The major catalysts are known as dual function catalysts, i.e. catalysts that exhibit both hydrogenation activity with carried metals and cracking activity with solid acids of carriers. Among these the most common are catalysts employing carried metals that are combinations of nickel or cobalt, metals of Group 8 of the Periodic Table, and molybdenum or tungsten, metals of Group 6a of the Periodic Table. Most well known are double oxides such as silica-alumina, which are large surface area carriers with solid acidity.

A few systems are also known which employ ternary complex oxides as carriers. For example, Japanese Unexamined Patent Publication No. 58-210847 discloses a system wherein silica or magnesia are added as secondary components to alumina-titania, and Japanese Unexamined Patent Publication No. 58-210993 discloses a system wherein a ternary complex oxide comprising alumina, titania and zirconia is used as the carrier. These publications disclose improvements in demetalization activity on heavy oils.

In Japanese Unexamined Patent Publication No. 58-219293 it is disclosed that effective hydrocracking of heavy oils can be accomplished with catalysts having hydrogenating metals carried on carriers containing alumina as the main component and at least one inorganic oxide selected from among silica, titania, zirconia, boria and phosphia, or carriers containing titania as the main component and at least one inorganic oxide selected from among alumina, silica, zirconia, boria and phosphia.

However, in systems employing the above-mentioned amorphous complex oxides as carriers, there is a limit to the improvement in catalytic activity, while the effect of increased middle distillates is inadequate.

Numerous catalysts are known containing zeolites in addition to the above-mentioned complex oxides. Zeolites suitable as hydrocracking catalysts include synthetic Y-type zeolite, and Y-type zeolite stabilized by various treatments. Zeolite has a higher acid density compared to amorphous complex oxides. Zeolite used by itself has high cracking activity but causes overcracking, resulting in a lower middle distillate yield. The purpose of the stabilization treatment mentioned above is to lower the unit lattice constant of the zeolite, reduce the acid density and improve selectivity. For example, Japanese Patent No. 2562322, No. 2563910 and No.2619700 disclose hydrocracking methods aimed at selectively improving the middle distillate yield by a catalyst containing Y-type zeolite with a low unit lattice constant.

However, using catalysts with the compositions and physical properties described in these Japanese patents cannot give adequate cracking activity and middle distillate selectivity. This means that until now, due attention has not been given to the properties which reflect zeolite function.

SUMMARY OF THE INVENTION

It is a first object of the present invent ion to provide a catalyst with excellent hydrocracking performance for producing middle distillates from heavy petroleum distillates such as vacuum gas oil.

It is a second object of the present invention to provide a hydrocracking method using the catalyst, which gives middle distillates as the major product.

Based on the finding that zeolite-based hydrocracking catalysts characterized by the physical properties described above do not exhibit fully satisfactory selectivity and cracking activity, the present invention provides a catalyst obtained by an improved catalyst preparation process and capable of giving high yields of middle distillates, as well as a hydrocracking method for petroleum distillates which employs the catalyst.

As a result of much diligent research aimed at overcoming the aforementioned problems, the present inventors have completed the present invention upon the finding that a hydrocracking catalyst wherein the carrier is a mold of zeolite with specific physical properties and a complex oxide exhibits high cracking activity and high middle distillate selectivity in hydrocracking of heavy petroleum distillates under specific reaction conditions.

One aspect of the present invention is to provide a hydrocracking catalyst for hydrocarbon oil, said catalyst comprising (i) a complex oxide with at least 2 different elements selected from Group 3b, Group 4a, Group 4b and Group 5b of the Periodic Table, (ii) zeolite having a solid aluminum-NMR spectrum wherein the ratio A/B of the peak area A in a chemical shift of −30 to 18 ppm to the peak area B in a chemical shift of 20–100 ppm is 0.01–0.39 and whose surface area of pores of diameter 10 angstrom or smaller constitutes 10–85% of the total surface area, and (iii) at least one metal selected from Group 6a and Group 8 of the Periodic Table.

The hydrocracking catalyst for hydrocarbon oil according to the present invention has excellent hydrocracking performance for hydrocarbon oil, and can produce middle distillates from heavy petroleum distillates such as vacuum gas oil with high selectivity and high cracking activity.

Another aspect of the present invention is to provide a method for hydrocracking of petroleum distillates with a boiling point of 250–600° C. using a catalyst system which includes a reactor of a flow reactor apparatus packed with the aforementioned hydrocracking catalyst, in the presence of hydrogen, under conditions with a reaction temperature of 100–800° C., a reaction pressure of 3–30 MPa, an LHSV of 0.01–10 $h^{-1}$ and a hydrogen/oil ratio of 100–2500 $Nm^3/m^3$.

The hydrocracking method of the present invention which employs this catalyst can accomplish hydrocracking of heavy petroleum distillates to produce middle distillates with a high hydrocracking activity and with high middle distillate selectivity.

The zeolite used according to the present invention may be normal zeolite, but X and Y type zeolites with a faujasite crystal structure are preferred. Y type zeolite is particularly preferred as the zeolite to be used for the present invention. According to the present invention, the zeolite used has specific physical properties to allow production of the desired middle distillates at a high yield.

BRIEF DESCRIPTION OF THE DRAWINGS

FIGURE is a chart showing a solid Al-NMR spectrum for typical USY zeolite.

DETAILED DESCRIPTION OF THE PREFERRED EMBODIMENTS

As seen by the solid Al-NMR spectrum for typical USY zeolite shown in FIGURE, two peaks are present at chemical shifts of near 0 ppm and near 50 ppm. The theory and actual observation are well known, and are explained for example in the publication "Science and Applications of Zeolite" (Kodansha, 1987, pp.31–35, pp.122–128).

The former peak represents tetracoordinated Al atoms and the latter peak represents hexacoordinated Al atoms. It has been assumed that tetracoordinated Al, being the acid point, is the cracking activity site while hexacoordinated Al essentially does not contribute to the hydrocracking reaction.

However, the present inventors have found that reaction selectivity changes with the proportion of hexacoordinated Al present. Since both peaks have a given width, the amount of hexacoordinated Al present was represented by the peak area B in the range of 20 to 100 ppm while the amount of tetracoordinated Al present was represented by the peak area A in the range of −30 to 18 ppm, and the area ratio A/B was used as an index of the performance of the zeolite.

Zeolite used as a hydrocracking catalyst is suitable when the aforementioned area ratio A/B is 0.01–0.39, while 0.02–0.35 is preferred, 0.03–0.30 is more preferred, and 0.05–0.25 is most preferred.

The present inventors have also found that zeolite used for hydrocracking has an acceptable pore distribution. Naphtha is produced by overcracking of middle distillates. In order to prevent overcracking it is necessary to increase the diffusion rate of the feedstock material and middle distillates in the zeolite pores. Here, the percentage of the surface area of pores with a diameter of 10 angstrom or smaller among the total surface area was calculated by the BET method or t-plot method and used as an index of the diffusion rate limit.

Specifically, if Sa is the BET surface area and Sb is the surface area of pores with diameter over 10 angstrom as determined by t-plot, then the index F of the diffusion rate limit may be represented as follows.

$$F = (Sa - Sb)/Sa \times 100$$

As a result, the present inventors have found that zeolite with an F value of 10–85% has an effect which minimizes overcracking. The F value is preferably 15–80%, and more preferably 20–75%.

The aforementioned complex oxide comprises, specifically, at least 2 different elements including silicon, aluminum, titanium, zirconium, boron or phosphorus. It is preferably an oxide of silicon-aluminum, silicon-titanium, silicon-zirconium, silicon-aluminum-titanium, silicon-zirconium-aluminum, aluminum-boron or silicon-aluminum-boron. More preferred are silicon-aluminum, silicon-zirconium-aluminum and aluminum-boron.

The method used to prepare the complex oxide may be a well-known method such as the coprecipitating method, kneading method or depositing method.

For example, it may be prepared by one of the following methods.

Addition of an alkali to an acidic aqueous solution mixture containing at least two different elements of the aforementioned groups, to obtain a deposited complex hydroxide.

Addition of an acid to an alkali aqueous solution mixture containing at least two different elements of the aforementioned groups, to obtain a deposited complex hydroxide.

Mixture of an acidic solution containing at least one element of the aforementioned groups with an alkali solution containing at least one element of the aforementioned groups, to obtain a complex hydroxide.

Addition of an aqueous solution containing at least one element of the aforementioned groups to a hydroxide containing at least one element of the aforementioned groups, to obtain a deposited complex composition.

Addition of a hydroxide or oxide containing at least one element of the aforementioned groups, or a precursor thereof, to a hydroxide containing at least one element of the aforementioned groups, to obtain a complex composition.

After adding the zeolite to the resulting complex hydroxide, etc. mentioned above, the mixture is thoroughly kneaded. This is then molded into a desired shape, dried and calcined to obtain a catalyst carrier. The zeolite can be added during any step of the preparation. The timing of the addition is preferably during preparation of the complex hydroxide, or during its aging or kneading. The calcining conditions may be those for calcining of common catalyst carriers, and are preferably selected from 400–800° C., 0.5–6 hours.

The proportions of the zeolite and the complex oxide with at least two elements selected from among Group 3b, Group 4a, Group 4b and Group 5b of the Periodic Table according to the present invention are 0.5–70 wt. % of the zeolite and 30–95.5 wt. % of the complex oxide with respect to the carrier. The ratio of zeolite is preferably 1–30 wt. %, more preferably 2–20 wt. % and most preferably 3–15 wt. %.

According to the present invention, a metal with hydrogenating activity is carried on the catalyst carrier prepared in the manner described above, for use as the catalyst. The carried metal of the present invention is at least one metal selected from Group 6a and Group 8 of the Periodic Table. Preferably selected are molybdenum and/or tungsten, and nickel and/or cobalt. It is preferred to load 4–40 wt. % of a metal of Group 6a and 0.5–20 wt. % of a metal of Group 8 of the Periodic Table. These metals may be incorporated using well-known methods, such as the impregnation method, immersion method or kneading method. Specifically, they may be added during a step of preparing the complex hydroxide used for the carrier.

Feedstock oils for which the method of the present invention may be applied include not only gas oil, vacuum gas oil, topped crude oil, vacuum crude oil, deasphalted oil, contact cracking cycle oil, coker gas oil and other petroleum distillates, but also coal liquefaction oil, shale oil, tar sand oil and other heavy hydrocarbon oils. These hydrocarbon oils may previously be subjected to hydrogenation treatment.

The hydrocracking method of the present invention is carried out using a flow reactor apparatus. The hydrocracking method of the present invention may also employ a system combining a pretreatment catalyst and the aforementioned hydrocracking catalyst. The pretreatment catalyst and the hydrocracking catalyst may be loaded into the same reactor, or they may be loaded into separate reactors. The pretreatment catalyst is used in a step prior to the hydrocracking catalyst. The purpose of the pretreatment catalyst is to remove metal compounds and nitrogen compounds from the feedstock oil.

Pretreatment catalysts that can be used for the present invention include catalysts used for hydrodesulfurization of petroleum distillates. The pretreatment catalyst is preferably a catalyst having at least one metal from among molybdenum, tungsten, nickel and cobalt carried on a stable metal oxide carrier. The carrier of the pretreatment catalyst is preferably alumina or silica-alumina. The metal used is more preferably at least one metal from among nickel and cobalt with at least one metal from among molybdenum and tungsten. As particularly preferred pretreatment catalysts there may be mentioned catalysts with nickel and molybdenum carried on alumina and catalysts with cobalt and molybdenum carried on alumina. The loading of these metals is preferably in the range of 3–50% based on the dry oxide mass.

The pretreatment catalyst and hydrocracking catalyst used for the present invention are preferably subjected to sulfurization treatment prior to the reaction. The sulfurization treatment may be carried out by a publicly known method. As examples of sulfurizing agents to be used for the sulfurization treatment there may be mentioned hydrogen sulfide, carbon disulfide, dimethyl disulfide, sulfur-containing petroleum distillates, and so forth.

According to the present invention, petroleum distillates with a boiling point of 250–600° C. are subjected to hydrocracking using a catalyst system which includes a reactor of a flow reactor apparatus packed with the aforementioned hydrocracking catalyst, in the presence of hydrogen, under conditions with a reaction temperature of 100–800° C., a reaction pressure of 3–30 MPa, an LHSV of 0.01–10 h$^{-1}$ and a hydrogen/oil ratio of 100–2500 Nm$^3$/m$^3$. The hydrocracking is more preferably carried out under conditions with a reaction temperature of 300–500° C., a reaction pressure of 5–20 MPa, an LHSV of 0.05–5 h$^{-1}$ and a hydrogen/oil ratio of 200–1500 Nm$^3$/m$^3$.

In addition, when petroleum distillates with a high nitrogen content and a boiling point of 250–600° C. are subjected to hydrocracking using a catalyst system which includes a reactor of a flow reactor apparatus packed with a pretreatment catalyst and the aforementioned hydrocracking catalyst, in the presence of hydrogen, under conditions with a reaction temperature of 100–800° C., a reaction pressure of 3–30 MPa, an LHSV of 0.01–10 h$^{-1}$ and a hydrogen/oil ratio of 100–2500 Nm$^3$/m$^3$, the pretreatment catalyst used may be one which can reduce the nitrogen content of the petroleum distillates contacting the hydrocracking catalyst to 1000 ppm by weight or less. It is more preferred to reduce the nitrogen content of the petroleum distillates contacting the hydrocracking catalyst to 500 ppm by weight or less.

EXAMPLES

The subject matter of the present invention will now be explained in more detail by way of examples and comparative examples, with the understanding that the present invention is not limited thereto.

In the following examples and comparative examples, "A/B" represents the ratio of A the peak area in a chemical shift of –30 to 18 ppm to B the peak area in a chemical shift of 20–100 ppm in a solid Al-NMR spectrum, and the "F value" represents the percentage of the surface area of pores with a diameter of 10 angstrom or smaller.

Example 1

Y zeolite (A/B: 0.24, F value: 70%) was combined with an aluminum-boron complex hydroxide to obtain a gel. The gel was extruded and subjected to molding, drying and calcining to prepare a carrier. The zeolite content was 10% of the total weight of the carrier. This carrier was loaded with 5 wt. % nickel and 20 wt. % molybdenum by the impregnation method to produce catalyst A.

Catalytic Performance Evaluation

A vacuum gas oil with the properties listed in Table 1 was used as the feedstock oil for evaluation of the hydrocracking performance of catalyst A in a flow reactor apparatus in the presence of hydrogen under the reaction conditions listed in Table 2. The evaluation result is shown in Table 3 as a value relative to 100 defined as the middle distillate yield for Comparative Example 1 below.

Example 2

Y zeolite (A/B: 0.15, F value: 70%) was combined with an aluminum-boron complex hydroxide to obtain a gel. The gel was extruded and subjected to molding, drying and calcining to prepare a carrier. The zeolite content was 10% of the total weight of the carrier. This carrier was loaded with 5 wt. % nickel and 20 wt. % molybdenum by the impregnation method to produce catalyst B.

The hydrocracking performance of catalyst B was evaluated in the same manner as Example 1, using catalyst B instead of catalyst A, and the evaluation result is listed in Table 3.

Example 3

Y zeolite (A/B: 0.24, F value: 70%) was combined with a silicon-aluminum-boron complex hydroxide to obtain a gel. The gel was extruded and subjected to molding, drying and calcining to prepare a carrier. The zeolite content was 10% of the total weight of the carrier. This carrier was loaded with 5 wt. % nickel and 20 wt. % molybdenum by the impregnation method to produce catalyst C.

The hydrocracking performance of catalyst C was evaluated in the same manner as Example 1, using catalyst C instead of catalyst A, and the evaluation result is listed in Table 3.

Comparative Example 1

Y zeolite (A/B: 0.42, F value: 70%) was combined with an aluminum-boron complex hydroxide to obtain a gel. The gel was extruded and subjected to molding, drying and calcining to prepare a carrier. The zeolite content was 10% of the total weight of the carrier. This carrier was loaded with 5 wt. % nickel and 20 wt. % molybdenum by the impregnation method to produce catalyst D.

The hydrocracking performance of catalyst D was evaluated in the same manner as Example 1, using catalyst D instead of catalyst A, and the evaluation result is listed in Table 3.

Comparative Example 2

Y zeolite (A/B: 0.30, F value: 88%) was combined with an aluminum-boron complex hydroxide to obtain a gel. The gel was extruded and subjected to molding, drying and calcining to prepare a carrier. The zeolite content was 10% of the total weight of the carrier. This carrier was loaded with 5 wt. % nickel and 20 wt. % molybdenum by the impregnation method to produce catalyst E.

The hydrocracking performance of catalyst E was evaluated in the same manner as Example 1, using catalyst E instead of catalyst A, and the evaluation result is listed in Table 3.

Comparative Example 3

The same aluminum-boron complex hydroxide as Example 1 was extruded alone and then subjected to molding, drying and calcining to prepare a carrier. This carrier was loaded with 5 wt. % nickel and 20 wt. % molybdenum by the impregnation method to produce catalyst F.

The hydrocracking performance of catalyst F was evaluated in the same manner as Example 1, using catalyst F instead of catalyst A, and the evaluation result is listed in Table 3.

TABLE 1

Feedstock oil properties

| | |
|---|---|
| Density (at 15° C.) (g/cm$^3$) | 0.93 |
| Sulfur content (mass %) | 2.0 |
| Nitrogen content (mass ppm) | 1200 |
| Aniline point (° C.) | 85 |
| Boiling point (° C.) | 273–584 |

TABLE 2

Reaction conditions

| | |
|---|---|
| Reaction temperature (° C.) | 400 |
| Reaction pressure (kg/cm$^2$) | 70 |
| LHSV (h$^{-1}$) | 1.5 |
| Hydrogen/oil ratio (Nm$^3$/m$^3$) | 450 |

TABLE 3

Catalyst performance (relative values*)

| | Middle distillate yield |
|---|---|
| Example 1 | 128 |
| Example 2 | 125 |
| Example 3 | 123 |
| Comparative Example 1 | 100 |
| Comparative Example 2 | 102 |
| Comparative Example 3 | 93 |

*) Middle distillate yield for each catalyst relative to 100 as the middle distillate yield for Compartive Example 1

Table 3 shows that high middle distillate yields were obtained in Examples 1–3 which used hydrocracking catalysts according to the present invention. In contrast, the middle distillate yields were low in Comparative Examples 1–3 which used hydrocracking catalysts for comparison.

Example 4

Y zeolite (A/B: 0.24, F value: 70%) was combined with a silicon-zirconium-aluminum complex hydroxide to obtain a gel. The gel was extruded and subjected to molding, drying and calcining to prepare a carrier. The zeolite content was 10% of the total weight of the carrier. This carrier was loaded with 5 wt. % nickel and 20 wt. % tungsten by the impregnation method to produce catalyst G.

Catalytic Performance Evaluation

A vacuum gas oil with the properties listed in Table 1 above was used as the feedstock oil for evaluation of the hydrocracking performance of catalyst G in a flow reactor apparatus equipped with two reactors connected in series, in the presence of hydrogen under the reaction conditions listed in Table 4. The first stage reactor was packed with a pretreatment catalyst having 3% nickel and 14% molybdenum carried on alumina in terms of the dry oxide mass, and the second stage reactor was packed with hydrocracking catalyst G. The volume ratio of the pretreatment catalyst to hydrocracking catalyst G was 1:2. Prior to the reaction, the catalyst was subjected to sulfurization treatment with a solution of carbon disulfide dissolved in paraffin.

The nitrogen content of the petroleum distillates contacting with hydrocracking catalyst G after passing through the pretreatment catalyst zone was 180 ppm by weight.

The evaluation result is shown in Table 5 as a value relative to 100 defined as the middle distillate yield for Comparative Example 1 above.

Comparative Example 4

Y zeolite (A/B: 0.42, F value: 70%) was combined with a silicon-zirconium-aluminum complex hydroxide to obtain a gel. The gel was extruded and subjected to molding, drying and calcining to prepare a carrier. The zeolite content was 10% of the total weight of the carrier. This carrier was loaded with 5 wt. % nickel and 20 wt. % tungsten by the impregnation method to produce catalyst H.

The hydrocracking performance of catalyst H was evaluated in the same manner as Example 4, using catalyst H instead of catalyst G, and the evaluation result is listed in Table 5.

Comparative Example 5

Y zeolite (A/B: 0.30, F value: 88%) was combined with a silicon-zirconium-aluminum complex hydroxide to obtain a gel. The gel was extruded and subjected to molding, drying and calcining to prepare a carrier. The zeolite content was 10% of the total weight of the carrier. This carrier was loaded with 5 wt. % nickel and 20 wt. % tungsten by the impregnation method to produce catalyst I.

The hydrocracking performance of catalyst I was evaluated in the same manner as Example 4, using catalyst I instead of catalyst G, and the evaluation result is listed in Table 5.

Comparative Example 6

The same silicon-zirconium-aluminum complex hydroxide as in Example 3 was extruded alone and then subjected to molding, drying and calcining to prepare a carrier. This carrier was loaded with 5 wt. % nickel and 20 wt. % tungsten by the impregnation method to produce catalyst J.

The hydrocracking performance of catalyst J was evaluated in the same manner as Example 4, using catalyst J instead of catalyst G, and the evaluation result is listed in Table 5.

TABLE 4

Reaction conditions

| | |
|---|---|
| Reaction temperature (° C.) | 400 |
| Reaction pressure (kg/cm$^2$) | 120 |
| LHSV (h$^{-1}$) | 0.4 |
| Hydrogen/oil ratio (Nm$^3$/m$^3$) | 590 |

TABLE 5

| | Catalyst performance (relative values*) |
|---|---|
| | Middle distillate yield |
| Example 4 | 120 |
| Comparative Example 4 | 100 |
| Comparative Example 5 | 102 |
| Comparative Example 6 | 91 |

*) Middle distillate yield for each catalyst relative to 100 as the middle distillate yield for Compartive Example 1

Table 5 shows that a high middle distillate yield was obtained in Example 4 which used a hydrocracking catalyst according to the present invention. In contrast, the middle distillate yields were low in Comparative Examples 4–6 which used hydrocracking catalysts for comparison.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A hydrocracking catalyst for hydrocarbon oil, comprising (i) a complex oxide with at least 2 different elements selected from Group 3b, Group 4a, Group 4b and Group 5b of the Periodic Table, (ii) zeolite having a solid Al-NMR spectrum wherein the ratio A/B of the peak area A in a chemical shift of −30 to 18 ppm to the peak area B in a chemical shift of 20–100 ppm is 0.01–0.39 and whose surface area of pores of diameter 10 angstrom or smaller constitutes 10–85% of the total surface area, and (iii) at least one metal selected from Group 6a and Group 8 of the Periodic Table.

2. A hydrocracking catalyst according to claim 1, wherein said complex oxide is a complex oxide of at least 2 different elements selected from the group consisting of silicon, aluminum, titanium, zirconium, boron and phosphorus.

3. A hydrocracking catalyst according to claim 2, wherein said complex oxide is an oxide of elements selected from the group consisting of the combinations silicon-aluminum, silicon-titanium, silicon-zirconium, silicon-aluminum-titanium, silicon-zirconium-aluminum, aluminum-boron and silicon-aluminum-boron.

4. A hydrocracking catalyst according to claim 3, wherein said complex oxide is an oxide of elements selected from the group consisting of the combinations silicon-aluminum, silicon-zirconium-aluminum and aluminum-boron.

5. A hydrocracking catalyst according to claim 1, wherein the area ratio of said zeolite is from 0.02 to 0.35.

6. A hydrocracking catalyst according to claim 1, wherein the surface area of pores of diameter 10 angstrom or smaller constitutes 15–80% of the total surface area of said zeolite.

7. A hydrocracking catalyst according to claim 1, wherein said metal includes molybdenum and/or tungsten, and nickel and/or cobalt.

8. A hydrocracking method comprising a step of hydrocracking petroleum distillates with a boiling point of 250–600° C. in the presence of hydrogen using a catalyst system which includes a reactor packed of a flow reactor apparatus with a hydrocracking catalyst comprising (i) a complex oxide with at least 2 different elements selected from Group 3b, Group 4a, Group 4b and Group 5b of the Periodic Table, (ii) zeolite having a solid Al-NMR spectrum wherein the ratio A/B of the peak area A in a chemical shift of −30 to 18 ppm to the peak area B in a chemical shift of 20–100 ppm is 0.01–0.39 and whose surface area of pores of diameter 10 angstrom or smaller constitutes 10–85% of the total surface area, and (iii) at least one metal selected from Group 6a and Group 8 of the Periodic Table, under conditions with a reaction temperature of 100–800° C., a reaction pressure of 3–30 MPa, an LHSV of 0.01–10 $h^{-1}$ and a hydrogen/oil ratio of 100–2500 $Nm^3/m^3$.

9. A hydrocracking method according to claim 8, wherein the hydrocracking is carried out under conditions with a reaction temperature of 300–500° C., a reaction pressure of 5–20 MPa, an LHSV of 0.05–5 $h^{-1}$ and a hydrogen/oil ratio of 200–1500 $Nm^3/m^3$.

10. A hydrocracking method according to claim 8, comprising a pretreatment step in the presence of a pretreatment catalyst prior to said hydrocracking step.

11. A hydrocracking method according to claim 10, wherein said pretreatment catalyst is a hydrodesulfurization catalyst.

12. A hydrocracking method according to claim 10, wherein the hydrocracking is carried out after reducing the nitrogen content of the petroleum distillates contacting said hydrocracking catalyst to 1000 ppm by weight or less by said pretreatment step.

* * * * *